S. G. NEAL.
DIAPHRAGM CHECK VALVE.
APPLICATION FILED DEC. 26, 1916.
1,328,886.
Patented Jan. 27, 1920.
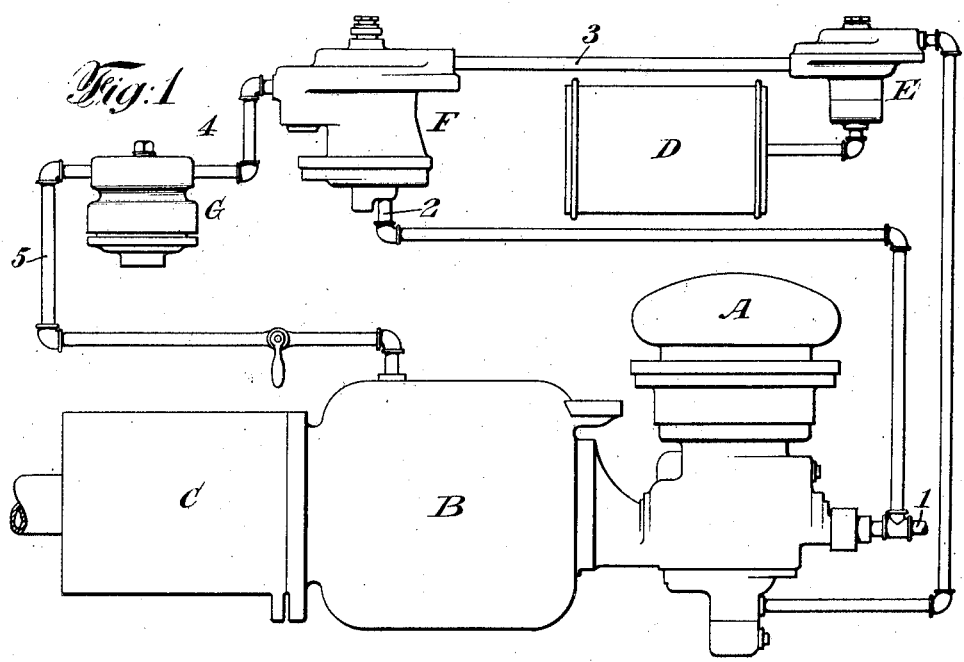
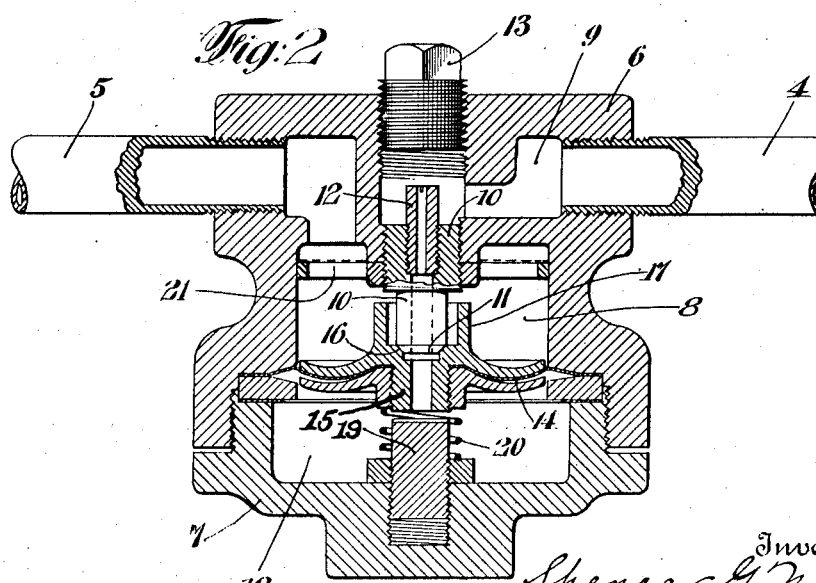
Inventor
Spencer G. Neal,
By his Attorneys

UNITED STATES PATENT OFFICE.

SPENCER G. NEAL, OF NEW YORK, N. Y., ASSIGNOR, BY MESNE ASSIGNMENTS, TO AUTOMATIC STRAIGHT AIR BRAKE COMPANY, OF WILMINGTON, DELAWARE, A CORPORATION OF DELAWARE.

DIAPHRAGM CHECK-VALVE.

1,328,886.  Specification of Letters Patent.  Patented Jan. 27, 1920.

Application filed December 26, 1916. Serial No. 138,754.

*To all whom it may concern:*

Be it known that I, SPENCER G. NEAL, a citizen of the United States, and resident of the borough of Manhattan, city, county, and State of New York, have invented certain new and useful Improvements in Diaphragm Check-Valves, of which the following is a specification.

In United States Letters Patent No. 1,183,103, dated May 16, 1916, a check valve is shown between the quick release valve and the emergency reservoir connection, to prevent train pipe air flowing through the quick release valve to the emergency reservoir during the charging operation, the said check valve being so constructed and arranged as to permit emergency reservoir air to flow back to the train pipe upon a quick release of the brakes.

The check valve shown in the drawings and described herein is designed for use in a braking apparatus like that disclosed in the aforesaid patent. It is designed to be located between the quick release valve and the emergency reservoir to prevent train pipe air passing from the said quick release valve to the emergency reservoir, but operating to permit emergency reservoir air passing back through the quick release valve to the train pipe upon a quick release of the brakes.

One of the main objects of the invention is to provide a check valve wherein the train pipe air will operate upon a diaphragm to hold the valve closed against emergency reservoir pressure, this latter pressure operating upon the diaphragm to open the valve when the train pipe pressure is suddenly increased to bring about a quick release of the brakes.

Another object of the invention is to provide a diaphragm check valve in which the valve is closed and maintained closed by a superior pressure, the said valve being opened to release the inferior pressure when the superior or holding pressure is reduced.

There are many other important objects and advantages of the invention which will appear hereinafter.

While the diaphragm check valve is shown in the drawing and described herein in connection with an air brake apparatus, it is adapted for many uses, and I am not to be restricted to the specific use described herein.

In the drawing, Figure 1 is a diagrammatic view of an air brake apparatus showing the diaphragm check valve in position between the quick release valve and the emergency reservoir; and Fig. 2 a vertical sectional view of the diaphragm check valve.

Referring to the parts shown in Fig. 1, A designates the triple valve; B the emergency reservoir; C the brake cylinder; D the train pipe or train pipe augmenting reservoir; E the retaining or change-over valve; F the quick release valve; and G the diaphragm check valve. 1 designates the train pipe which is connected to the triple valve in the usual manner. 2 designates a branch of the train pipe which is connected to the quick release valve; 3 a pipe connecting the quick release valve to the retaining or change-over valve E; 4 a pipe connecting the quick release valve to the diaphragm check valve, and 5 a pipe connecting this latter valve with the emergency reservoir.

These parts, with the exception of the diaphragm check valve, are shown and described in the afore-mentioned Patent No. 1,183,103, and it is thought that a detailed description thereof is unnecessary.

As shown and described in Letters Patent No. 1,128,622, dated February 16, 1915, and Patent No. 1,183,103, dated May 16, 1916, a quick release of the brakes is secured by a predetermined increase in train pipe pressure, this increase in pressure operating the quick release valve to connect the emergency reservoir with the train pipe. The apparatus shown in diagram in Fig. 1 of the drawing is designed to operate in the same manner, a predetermined increase in the train pipe pressure operating the quick release valve F to release emergency reservoir air to the train pipe.

The diaphragm check valve comprises an upper body part or section 6 and a lower section 7, this latter section screwing into the lower end of the main body part or section. In the main section of the check valve is formed an emergency reservoir chamber 8, which serves as a supply chamber, to which is connected the pipe 5 leading to the emergency reservoir. In this section is also formed an inlet or train pipe chamber 9 to which chamber pipe 4 is connected, said pipe leading to the emergency reservoir chamber of the quick release valve. In the bottom wall of the train pipe chamber 9 is screwed a depending central hollow post 10, the lower end of which projects into the emergency reservoir chamber, its lower end forming a valve 11. Into the upper end of this hollow post is screwed a restricting plug 12, said plug having a central aperture of a predetermined desired capacity and opening into the hollow post. The upper end of the inlet or train pipe chamber is closed by a removable plug 13 screwed into the top of the main section of the valve. By removing this closure plug the restriction plug may be adjusted to place, or removed, as desired, and without disturbing any other part of the valve.

The lower wall of the emergency reservoir chamber is formed by a movable abutment or diaphragm 14, said diaphragm being larger in diameter than the valve 11 and formed with a central hub 15 which is apertured centrally, a valve seat 16 being formed around the upper end of said aperture. This seat is adapted to receive the valve formed on the lower end of the central post 10. Formed on the hub of the diaphragm is an annular upwardly extending flange 17 which surrounds the valve post 10, said flange serving in the nature of a guide for the diaphragm in its vertical reciprocation.

Below the abutment 14 is a supplemental train pipe or holding chamber 18, formed by the lower section 7 of the valve casing, said chamber being in communication with the inlet or train pipe chamber 9 through the restriction plug, the hollow post 10 and the aperture through the diaphragm or abutment 14. In the chamber 18 is a central upwardly extending adjustable stop 19 which is adapted to be engaged by the lower end of the abutment hub to restrict the downward movement of the diaphragm. Surrounding this central stop is a spring 20 which engages the lower end of the hub of the abutment and normally forces said abutment upwardly to hold the valve seat 16 against the valve 11.

Across the upper portion of the emergency reservoir chamber is arranged a screen 21 which prevents particles of dirt entering the emergency reservoir chamber, thereby keeping the valve seat and the restriction plug free of obstructions.

The operation of the device may be briefly described as follows:

In charging the system train pipe air will flow through the quick release valve and pipe 4 to the inlet or train pipe chamber 9; through restriction plug 12, hollow post 10 and the aperture in the hub of the abutment 14, to holding chamber 18. The spring 20 normally maintains the diaphragm in its raised position and holds the seat 16 against the valve 11. The train pipe air in the chamber 18 firmly holds the valve 11 seated and prevents train pipe air entering the supply or emergency reservoir chamber 8. The emergency reservoir, and the emergency reservoir chamber, will be charged in the usual way through the triple valve, so that emergency reservoir pressure will be built up in the emergency reservoir chamber and will oppose the train pipe pressure and spring 20 on the lower side of the abutment 14.

Upon an increase in train pipe pressure to cause a quick release of the brakes, train pipe air will be released from the train pipe chamber 9 and from the holding chamber 18 through the hollow post 10 and the restriction plug 12. The superior auxiliary reservoir pressure in the emergency reservoir chamber 8 will then depress abutment 14 and remove valve seat 16 from the valve 11 and permit emergency reservoir air to pass through the hollow post 10 and restriction plug 12 to the train pipe chamber 9, and thence through pipe 4 and quick release valve to the train pipe. Just before an equalization of pressures has taken place between the emergency reservoir air and train pipe air, the spring 20 will again move the abutment 14 and bring the seat 16 against the valve 11 so that upon an increase in train pipe pressure air will again flow into the holding chamber 18 and again securely hold the valve 11 closed to prevent emergency reservoir air passing into the train pipe chamber.

The object of the removable restriction plug is to cause the emergency reservoir air to flow to the train pipe at the desired rate. It is manifest that by providing a restriction plug having an aperture of the desired capacity, the desired rate of flow may be secured. To change the rate of flow it is only necessary to remove the restriction plug, and to substitute therefor one with an aperture having the desired capacity.

The train pipe chamber forms an inlet chamber to receive the holding pressure during the charging operation, but is also the outlet from the valve when the emergency reservoir pressure flows from the supply chamber through the restriction plug into said train pipe or inlet chamber. The holding pressure is supplied to the holding chamber through the aperture in the diaphragm. It is manifest, however, that it may be supplied to said chamber in any other manner and by any suitable means, it being only necessary that the said holding pressure shall be varied in order to permit the emergency reservoir pressure in the supply chamber to move the diaphragm or abutment and thereby open communication between the supply chamber and the inlet chamber. The valve is suitable for use in any apparatus where variable pressures may be supplied to opposite sides of the diaphragm, a controlling pressure being supplied to one side of the diaphragm and the supply pressure operating upon the opposite side of the diaphragm. Variations in the holding pressure will permit the supply pressure to move the abutment and thereby open the valve.

What I claim is:

1. A diaphragm check valve comprising a casing formed with a train pipe chamber, an emergency reservoir chamber, a movable abutment forming one wall of said emergency reservoir chamber, a supplemental train pipe chamber formed on the opposite side of said movable abutment, a valve controlling communication between the train pipe chamber and the emergency reservoir chamber, means affording communication between the train pipe chamber and the supplemental train pipe chamber through said movable abutment, and a spring for normally holding the movable abutment in position to close said valve.

2. A diaphragm check valve comprising a casing formed with an inlet chamber and a holding chamber, a movable abutment forming one wall of the holding chamber, means for permitting fluid from the inlet chamber to pass into the holding chamber, a supply chamber on the opposite side of the abutment from the holding chamber, a valve controlling communication between the supply chamber and the inlet chamber and actuated by the abutment, whereby when the superior pressure is in the holding chamber communication between the supply chamber and the inlet chamber will be closed and when the pressure in the holding chamber is reduced the pressure in the supply chamber will move the abutment and open communication between the supply chamber and the inlet chamber, and an apertured removable restriction plug to control the rate of flow between the supply chamber and the inlet chamber.

3. A diaphragm check valve comprising a casing formed with an inlet chamber and a holding chamber, a movable abutment forming one wall of the holding chamber, means for permitting fluid from the inlet chamber to pass into the holding chamber, a supply chamber on the opposite side of the abutment from the holding chamber, a valve controlling communication between the supply chamber and the inlet chamber and actuated by the abutment, whereby when the superior pressure is in the holding chamber communication between the supply chamber and the inlet chamber will be closed and when the pressure in the holding chamber is reduced the pressure in the supply chamber will move the abutment and open communication between the supply chamber and the inlet chamber, and a spring in the holding chamber bearing on the abutment and normally seating the valve.

4. A diaphragm check valve comprising a casing formed with an inlet chamber and a holding chamber, a movable abutment forming one wall of the holding chamber and provided with a central aperture opening into the holding chamber, a supply chamber on the opposite side of the abutment from the holding chamber, a rigid stationary hollow post extending from the inlet chamber into the supply chamber and formed with a valve at its free end, a valve seat formed in the abutment around the aperture therein and adapted to receive the valve on the end of the hollow post said hollow post and the aperture in the abutment affording communication between the inlet chamber and the holding chamber, whereby a superior pressure in the holding chamber will close communication between the supply chamber and the inlet chamber while maintaining communication between the inlet chamber and the holding chamber, and a superior pressure in the supply chamber will move the abutment and open communication between the supply chamber and the inlet chamber through the said hollow post.

5. A diaphragm check valve comprising a casing formed with an inlet chamber and a holding chamber, a movable abutment forming one wall of the holding chamber and provided with a central aperture opening into the holding chamber, a supply chamber on the opposite side of the abutment from the holding chamber, a hollow post extending from the inlet chamber into the supply chamber and formed with a valve at its free end, a valve seat formed in the abutment around the aperture therein and adapted to receive the valve on the end of the hollow post said hollow post and the aperture in the abutment affording communication between the inlet chamber and the holding chamber, and an apertured restriction plug removably secured in the hollow post to control the rate of flow between the chambers.

6. A diaphragm check valve comprising a casing formed with an inlet chamber and a holding chamber, a movable abutment forming one wall of the holding chamber and provided with a central aperture opening into the holding chamber, a supply chamber on the opposite side of the abutment from the holding chamber, a hollow post extending from the inlet chamber into the supply chamber and formed with a valve at its free end, a valve seat formed in the abutment around the aperture therein and adapted to receive the valve on the end of the hollow post said hollow post and the aperture in the abutment affording communication between the inlet chamber and the holding chamber, and a spring in the holding chamber bearing on the abutment and normally seating the valve to close communication between the supply chamber and the inlet chamber.

7. In a fluid-actuated check valve, a single diaphragm forming a holding chamber and a supply chamber, means for admitting a holding pressure to the holding chamber and a fluid pressure supply to the supply chamber, a valve controlled by said diaphragm and closing the supply chamber when a superior pressure is in the holding chamber and opening the supply chamber to the inlet chamber when a superior pressure is in the supply chamber, the inlet chamber thereupon becoming the outlet chamber, and removable means for predetermining the rate of flow from the supply chamber to the inlet chamber.

8. In a fluid-actuated check valve, a single diaphragm forming a holding chamber and a supply chamber, means for admitting a holding pressure to the holding chamber and a fluid pressure supply to the supply chamber, a valve controlled by said diaphragm and closing the supply chamber when a superior pressure is in the holding chamber and opening the supply chamber to the inlet chamber when a superior pressure is in the supply chamber, the inlet chamber thereupon becoming the outlet chamber, removable means for predetermining the rate of flow from the supply chamber to the inlet chamber, and means in the holding chamber to close the said valve upon an equalization of pressures on opposite sides of the diaphragm.

9. A diaphragm check valve as defined in claim 1 and wherein the movable abutment is formed by a single diaphragm and is exposed on opposite sides to controlling pressures.

10. A diaphragm check valve as defined in claim 1 and wherein the movable abutment is formed by a single diaphragm.

In testimony whereof I hereunto affix my signature.

SPENCER G. NEAL.